(12) United States Patent
Shin et al.

(10) Patent No.: US 9,792,065 B2
(45) Date of Patent: Oct. 17, 2017

(54) MEMORY CONTROLLER SCHEDULING REQUESTS ACCORDING TO SCORES

(71) Applicants: SK hynix Inc., Icheon (KR); KOREA ADVANCED INSTITUTE OF SCIENCE AND TECHNOLOGY, Daejeon (KR)

(72) Inventors: Won-Gyu Shin, Seoul (KR);
Jung-Whan Choi, Daejeon (KR);
Lee-Sup Kim, Daejeon (KR);
Young-Suk Moon, Yongin (KR);
Yong-Kee Kwon, Icheon (KR)

(73) Assignees: SK HYNIX INC., Icheon (KR);
KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 35 days.

(21) Appl. No.: 14/885,902

(22) Filed: Oct. 16, 2015

(65) Prior Publication Data
US 2016/0231961 A1    Aug. 11, 2016

(30) Foreign Application Priority Data
Feb. 5, 2015 (KR) .......................... 10-2015-0018016

(51) Int. Cl.
*G06F 12/00*    (2006.01)
*G06F 3/06*    (2006.01)
(Continued)

(52) U.S. Cl.
CPC .......... *G06F 3/0629* (2013.01); *G06F 3/0604* (2013.01); *G06F 3/0673* (2013.01); *G06F 12/0215* (2013.01); *G06F 12/123* (2013.01)

(58) Field of Classification Search
CPC .... G06F 3/0604; G06F 3/0629; G06F 3/0673; G06F 12/0215; G06F 12/123
(Continued)

(56) References Cited

U.S. PATENT DOCUMENTS

| 5,881,264 A | 3/1999 | Kurosawa |
| 7,587,549 B1 * | 9/2009 | Arulambalam ....... G06F 3/0613 |
| | | 711/112 |

(Continued)

FOREIGN PATENT DOCUMENTS

KR    2002-0069186 A    8/2002

OTHER PUBLICATIONS

Donghyuk Lee et al., "Tiered-Latency DRAM: A Low Latency and Low Cost DRAM Architecture," In HPCA, 2013, pp. 1-12.

*Primary Examiner* — Reba I Elmore (57) ABSTRACT

A memory controller schedules requests to memory devices according to scores. For this purpose, the memory controller variably adjusts weights for determining the scores with respect to the requests, calculates the scores using the weights, and determines a processing order of the requests according to the scores. The memory controller includes a request queue, a scheduler, and a weight generation circuit. The request queue stores the requests provided from an external device. The scheduler calculates a score for each request included in the request queue and determines the processing order of the requests based on the scores for the requests. The weight generation circuit generates a weight vector including the weights used to calculate the scores.

13 Claims, 7 Drawing Sheets

(51) Int. Cl.
 *G06F 12/02* (2006.01)
 *G06F 12/123* (2016.01)
(58) Field of Classification Search
 USPC .......... 711/156, 167; 710/18, 28, 39, 54, 56;
 712/225, 245
 See application file for complete search history.

(56) References Cited

U.S. PATENT DOCUMENTS

| | | | |
|---|---|---|---|
| 2002/0038403 A1* | 3/2002 | Wolrich | G06F 9/52 711/104 |
| 2003/0061459 A1* | 3/2003 | Aboulenein | G06F 12/0215 711/167 |
| 2008/0215749 A1* | 9/2008 | Bala | H04L 12/66 709/233 |
| 2010/0278190 A1* | 11/2010 | Yip | H04L 12/5693 370/412 |
| 2010/0325327 A1 | 12/2010 | Marietta et al. | |
| 2012/0233523 A1* | 9/2012 | Krishnamoorthy | G06F 11/1068 714/758 |

* cited by examiner

| CONDITION | ELEMENT 1 | | | | | | |
|---|---|---|---|---|---|---|---|
| | WQL < LW | | LW <= WQL < HW | | WQL >= HW | | |
| | R | W | R | W | R | W | |
| VARIABLE (y1) | 1 | 0 | PREVIOUS VALUE | | 0 | 1 | |

| CONDITION | ELEMENT 2 | |
|---|---|---|
| | ACT | COL | PRE |
| VARIABLE (y2) | WC | | 0 |

| CONDITION | ELEMENT 3 | | | |
|---|---|---|---|---|
| | ACT | COL | | PRE |
| | | R | W | |
| VARIABLE (y3) | 0 | 2 | 1 | 0 |

MEMORY CONTROLLER SCHEDULING REQUESTS ACCORDING TO SCORES

The present application claims priority under 35 U.S.C. §119(a) to Korean Patent Application Number 10-2015-0018016, filed on Feb. 5, 2015, in the Korean Intellectual Property Office, which is incorporated herein by reference in its entirety as set forth in full.

BACKGROUND

1. Technical Field

The present disclosure relates to a memory controller. Particularly, embodiments of the present disclosure relate to a memory controller capable of variably adjusting weights for determining scores with respect to a plurality of requests, calculating the scores using the weights, and determining a processing order of the requests according to the scores.

2. Related Art

A memory controller determines a processing order of a plurality of requests provided from an external device, e.g., a host, in order to control a memory device.

A conventional memory controller has used a scheduling method such as a First Come First Served (FCFS) method or First Ready First Come First Served (FR-FCFS) method in order to determine a processing order of a plurality of requests provided from a host.

The FCFS method is a scheduling method of firstly processing a request firstly received, and the FR-FCFS method is the same as the FCFS method except that it firstly processes a request for a row in an open state.

As described above, a conventional memory controller performs the request scheduling by a fixed reference.

SUMMARY

Embodiments of the present disclosure are directed to a memory controller capable of improving its performance by variably controlling weights for various elements affecting scheduling performance in order to dynamically control a request scheduling rule.

In one embodiment of the present invention, a memory controller includes a request queue that stores requests provided from an external device, a scheduler that calculates a score for each request included in the request queue and determines a processing order of the requests based on the scores for the requests, and a weight generation circuit that generates a weight vector including weights used to calculated the scores.

According to the present technology, weights for various elements affecting scheduling performance are variably controlled to calculate scores, and request scheduling is performed according to the scores. As a result, it is possible to test performance for various scheduling rules in one memory controller, and an optimal scheduling rule is selected to thereby improve the scheduling performance.

BRIEF DESCRIPTION OF THE DRAWINGS

Features, aspects, and embodiments are described in conjunction with the attached drawings, in which.

DETAILED DESCRIPTION

Hereinafter, a memory controller according to embodiments of the present disclosure will be described in detail with reference to the accompanying drawings. In the following description, the same reference numerals are used to designate substantially the same elements.

Figure 1:
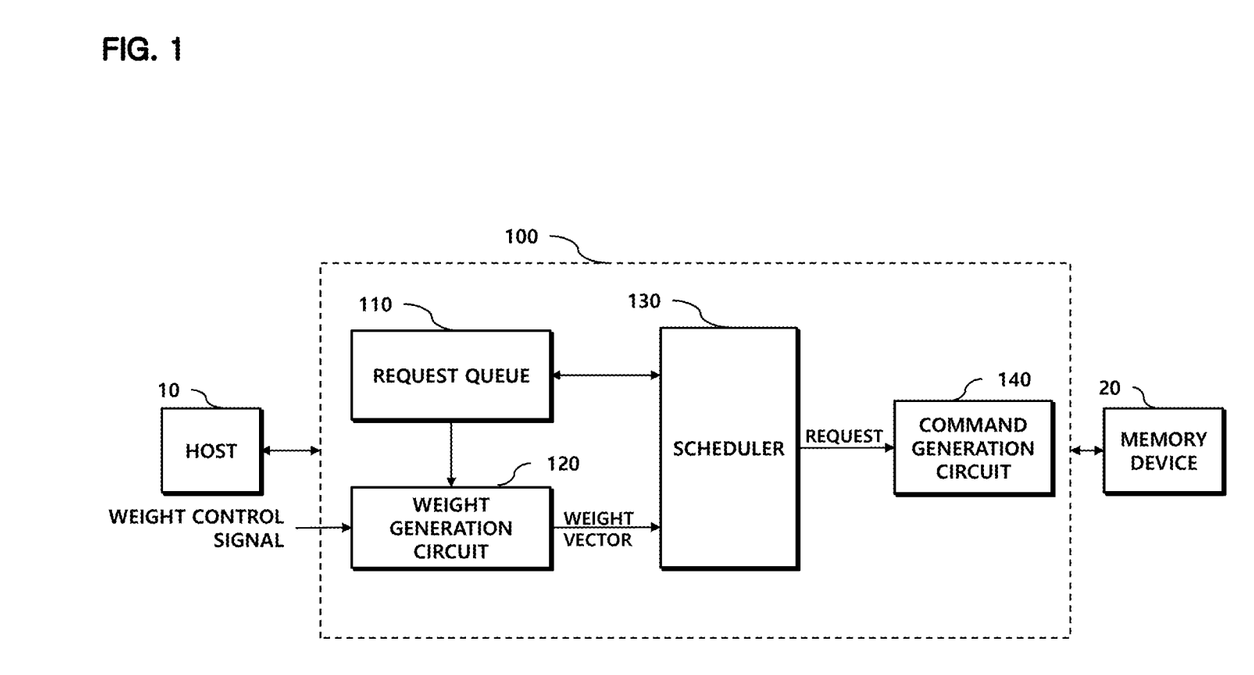
FIG. 1 is a block diagram of a memory system including a memory controller according to an embodiment of the present disclosure.

FIG. 1 is a block diagram of a memory system 1 including a memory controller 100 according to an embodiment of the present disclosure.

The memory controller 100 receives a read or write request from a host 1, and controls a memory device 20 in response to the request in order to perform a requested operation.

The memory controller 100 includes a request queue 110, a scheduler 130, and a command generation circuit 140. The request queue 110 stores read and write requests provided by the host 1. The scheduler 130 determines a processing order of the requests stored in the request queue 110 and outputs a request selected from the requests stored in the request queue 110. The command generation circuit 140 generates commands for controlling the memory device 20 based on the selected request output from the scheduler 130.

In an embodiment, the scheduler 130 calculates a score vector including scores for the requests stored in the request queue 110 and selects, among the requests, a request for performing an operation on the memory device 20 based on the calculated scores.

The memory controller 100 further includes a weight generation circuit 120 for generating a weight vector that includes one or more elements. Each element of the weight vector is multiplied by each variable value used when the scheduler 130 calculates the scores. The generation of the weight vector using the variable values will be described later.

The weight generation circuit 120 generates the weight vector with reference to a weight control signal and an operation state of the memory controller 100. The operation state includes states for the requests stored in the request queue 110.

The weight vector and score calculation scheme will be described in more detail below.

Figure 2:
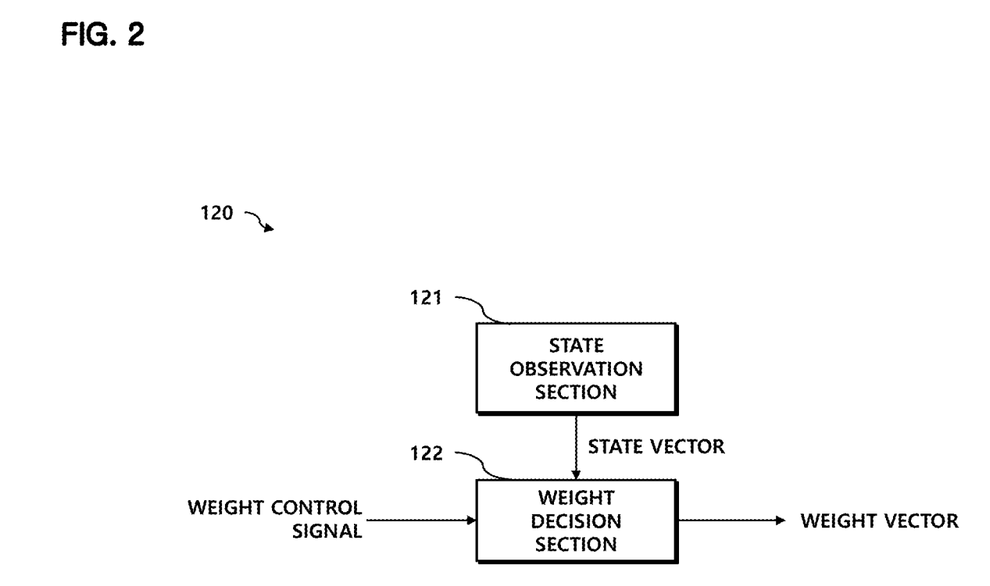
FIG. 2 is a block diagram of a weight generation circuit of FIG. 1 according to an embodiment of the present disclosure.

FIG. 2 is a block diagram illustrating the weight generation circuit 120 of FIG. 1 according to an embodiment.

The weight generation circuit 120 includes a state observation section 121 and a weight decision section 122.

The state observation section 121 observes the operation state of the memory controller 100 including the request queue 110 as illustrated in FIG. 1, recognizes a state of each request, and generates a state vector based on the states for the requests stored in the request queue 110.

In an embodiment, the state vector may include one or more elements including a length of a read queue, a length of a write queue, a maximum execution time of a predetermined number, e.g., 128, of requests recently processed, a value indicating whether an operation being processed relates to a read request or a write request, a hit rate in a prefetch operation, and the like.

A prefetch operation performed in a memory controller indicates an operation for reading in advance data from the memory device 20, the data being expected by the memory controller to be requested. A hit rate is a concept associated with probability that a read request is actually received to read the data that has been read in advance. Since the prefetch operation and the hit rate are concepts well-known in the related technology, a detailed description thereof will be omitted.

The weight decision section 122 may determine a weight vector with reference to the weight control signal or the state vector. The weight control signal may be generated in the memory controller 100 or provided by an external device, or may be provided by the host 10. The weight control signal may directly designate each element of the weight vector.

Figure 3:
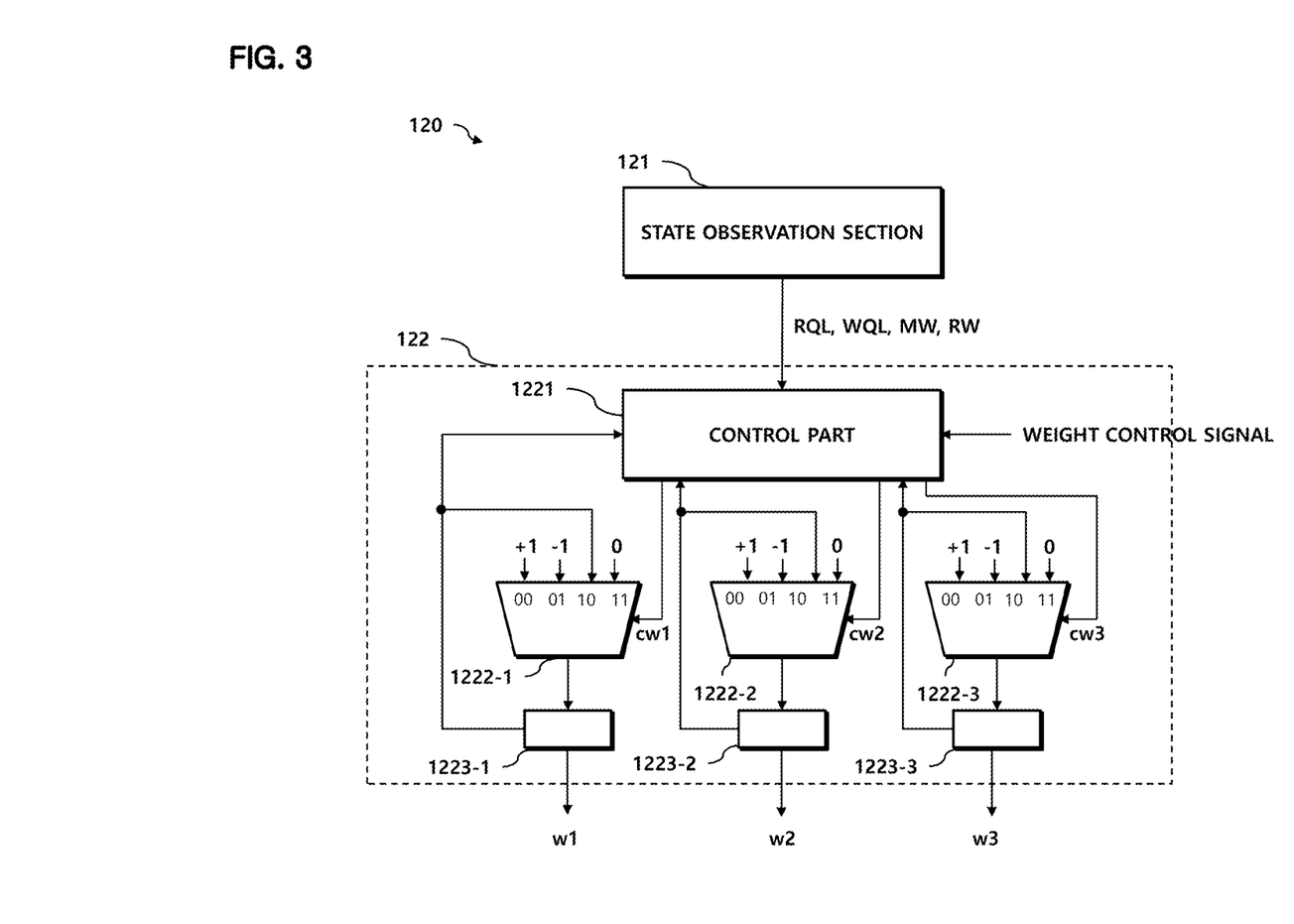
FIG. 3 is a detailed block diagram of the weight generation circuit of FIG. 1 according to an embodiment of the present disclosure.

FIG. 3 is a block diagram illustrating the weight generation circuit 120 of FIG. 1 according to an embodiment.

In the present embodiment, the state observation section 121 generates a state vector including, as elements, a length RQL of a read queue, a length WQL of a write queue, a maximum processing time MW of a predetermined number of requests recently processed, and a value RW indicating whether an operation selected by the scheduler 130 relates to a read request or a write request.

The weight decision section 122 includes a control part 1221, first to third selection parts 1222-1 to 1222-3, and first to third registers 1223-1 to 1223-3. The weight decision section 122 outputs a weight vector including a first weight w1, a second weight w2, and a third weight w3 as elements.

The control part 1221 generates and outputs first to third selection signals cw1 to cw3 for controlling the first to third selection parts 1222-1 to 1222-3 based on the weight control signal, the state vector, and values of weights w1 to w3 that are stored in the first to third registers 1223-1 to 1223-3, respectively.

The first selection part 1222-1 selects a designated value (1, −1, or 0) or the value of the first weight w1 stored in the first register 1223-1 according to the first selection signal cw1, and outputs the selected value as a new first weight w1.

The first weight w1 is multiplied by a first variable value (yi1) to output a first element used in calculating each score si of a score vector, i being in a range of 1 to N, the score vector including N scores. Accordingly, the first weight w1 is a factor for determining the influencing power of the first element in calculating each score si of the score vector. This will be described in more detail with reference to FIG. 6 below.

In FIG. 3, the designated values (1, −1, and 0) determined in advance are exemplary values, and may be changed according to an embodiment. For example, when the first weight w1 has a value 0, the first element does not affect the calculation of the score si. When the first weight w1 has a negative number, e.g., −1, the first element is considered as a negative factor in calculating the score si. When the first weight w1 has a positive number, e.g., 1, the first element is considered as a positive factor in calculating the score si.

Since configurations and operations of the second selection part 1222-2 and the third selection part 1222-3 are substantially the same as those of the first selection part 1222-1, a detailed description thereof will be omitted.

Figure 4:
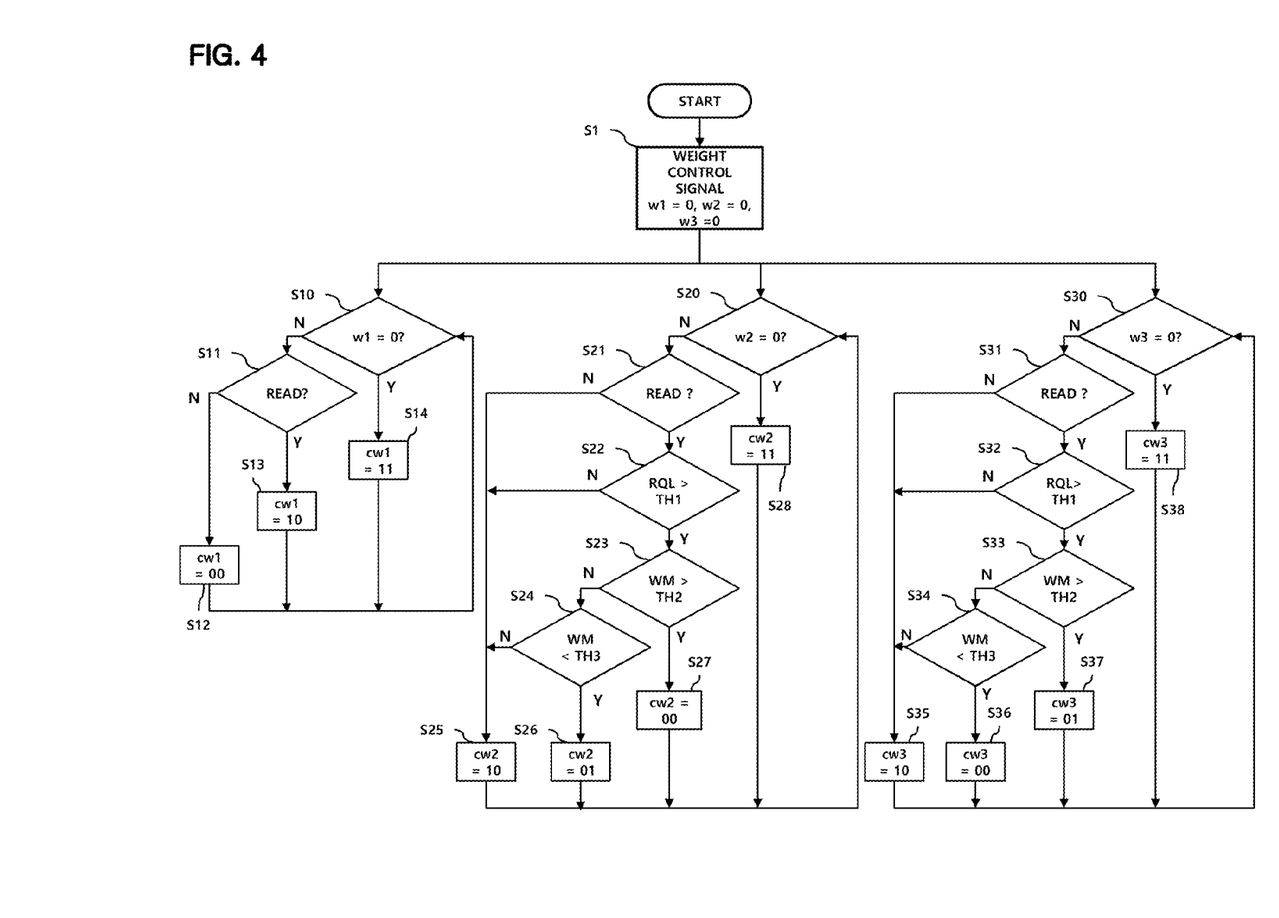
FIG. 4 is a flowchart illustrating an operation of a control part of FIG. 3 according to an embodiment of the present disclosure.

FIG. 4 is a flowchart illustrating an operation of the control part 1221 of FIG. 3 according to an embodiment In the present embodiment, the weight control signal may directly designate values of the first to third weights w1 to w3, and has higher priority than the state vector in determining the first to third weights w1 to w3.

The control part 1221 performs an operation S10 to S14 for determining a value of the first selection signal cw1, an operation S20 to S28 for determining a value of the second selection signal cw2, and an operation S30 to S38 for determining a value of the third first selection signal cw3.

The first weight w1 to the third weight w3 are initialized to 0 by the weight control signal at S1. The first weight w1 to the third weight w3 in steps S1, S10, S20 and S30 represents those designated by the weight control signal.

Hereinafter, the operation for determining the value of the first selection signal cw1 will be described.

If the weight control signal is input, the control part 1221 determines whether a value of the first weight w1 designated by the weight control signal is 0 at S10.

When the value of the first weight w1 designated by the weight control signal is 0, the control part 1221 sets the value of the first selection signal cw1 to 11 at S14.

When the value of the first selection signal cw1 is set to 11 at S14, the first selection part 1222-1 selects 0 as a new value of the first weight w1, and the selected value 0, i.e., the new value of the first weight w1 is stored in the first register 1223-1.

When the operation performed for the memory device 20 is determined to be a read request at S11, the control part 1221 sets the value of the first selection signal cw1 to 10 at S13. Otherwise, the control part 1221 sets the value of the first selection signal cw1 to 00 at S12.

When the value of the first selection signal cw1 is set to 10 at S13, the first selection part 1222-1 selects the value of the first weight w1 stored in the first register 1223-1, and the selected value is stored in the first register 1223-1 as the new value of the first weight w1. When the value of the first selection signal cw1 is set to 00, the first selection part 1222-1 selects 1, and the selected value 1 is stored in the first register 1223-1 as the new value of the first weight w1.

When the value of the first selection signal cw1 is set at S12 to S14 as described above, the control part 1221 returns to step S10 and repeats the aforementioned operation. Such repetition may be performed according to an information update cycle of the request queue 110.

Next, the operation for determining the value of the second selection signal cw2 will be described.

If the weight control signal is input, the control part 1221 determines whether a value of the second weight w2 designated by the weight control signal is 0 at S20.

When the value of the second weight w2 designated by the weight control signal is 0, the control part 1221 sets the value of the second selection signal cw2 to 11 at S28. Otherwise, the control part 1221 determines whether an operation performed for the memory device 20 relates to a read request at S21.

When the operation performed for the memory device 20 relates to a read request, the control part 1221 determines whether the length RQL of the read queue exceeds a first threshold value TH1 at S22. Otherwise, the control part 1221 sets the value of the second selection signal cw2 to 10 at S25.

When the length RQL of the read queue exceeds the first threshold value TH1, the control part 1221 determines whether the maximum processing time WM exceeds a second threshold value TH2 at S23. Otherwise, the control part 1221 sets the value of the second selection signal cw2 to 10 at S25.

When the maximum processing time WM exceeds the second threshold value TH2, the control part 1221 sets the value of the second selection signal cw2 to 00 at S27. Otherwise, the control part 1221 determines whether the maximum processing time WM is smaller than a third threshold value TH3 at S24.

When the maximum processing time WM is smaller than the third threshold value TH3, the control part 1221 sets the value of the second selection signal cw2 to 01 at S26. Otherwise, the control part 1221 sets the value of the second selection signal cw2 to 10 at S25.

When the value of the second selection signal cw2 is set at one of S25 to S28 as described above, the control part 1221 returns to step S20 and repeats the aforementioned operation. Such repetition may be performed according to the information update cycle of the request queue 110.

Finally, the operation for determining the value of the third selection signal cw3 will be described.

If the weight control signal is input, the control part 1221 determines whether a value of the third weight w3 designated by the weight control signal is 0 at S30.

When the value of the third weight w3 designated by the weight control signal is 0, the control part 1221 sets the value of the third selection signal cw3 to 11 at S38. Otherwise, the control part 1221 determines whether an operation performed for the memory device 20 relates to a read request at S31.

When the operation performed for the memory device 20 relates to a read request, the control part 1221 determines whether the length RQL of the read queue exceeds the first threshold value TH1 at S32. Otherwise, the control part 1221 sets the value of the third selection signal cw3 to 10 at S35.

When the length RQL of the read queue exceeds the first threshold value TH1, the control part 1221 determines whether the maximum processing time WM exceeds the second threshold value TH2 at S33. Otherwise, the control part 1221 sets the value of the third selection signal cw3 to 10 at S35.

When the maximum processing time WM exceeds the second threshold value TH2, the control part 1221 sets the value of the third selection signal cw3 to 01 at S37. Otherwise, the control part 1221 determines whether the maximum processing time WM is smaller than the third threshold value TH3 at S34.

When the maximum processing time WM is smaller than the third threshold value TH3, the control part 1221 sets the value of the third selection signal cw3 to 00 at S36. Otherwise, the control part 1221 sets the value of the third selection signal cw3 to 10 at S35.

When the value of the third selection signal cw3 is set at one of S35 to S38 as described above, the control part 1221 returns to step S30 and repeats the aforementioned operation. Such repetition may be performed according to the information update cycle of the request queue 110.

The aforementioned first to third threshold values TH1 to TH3 are arbitrary constant values selectable by those skilled in the art.

Figure 5:
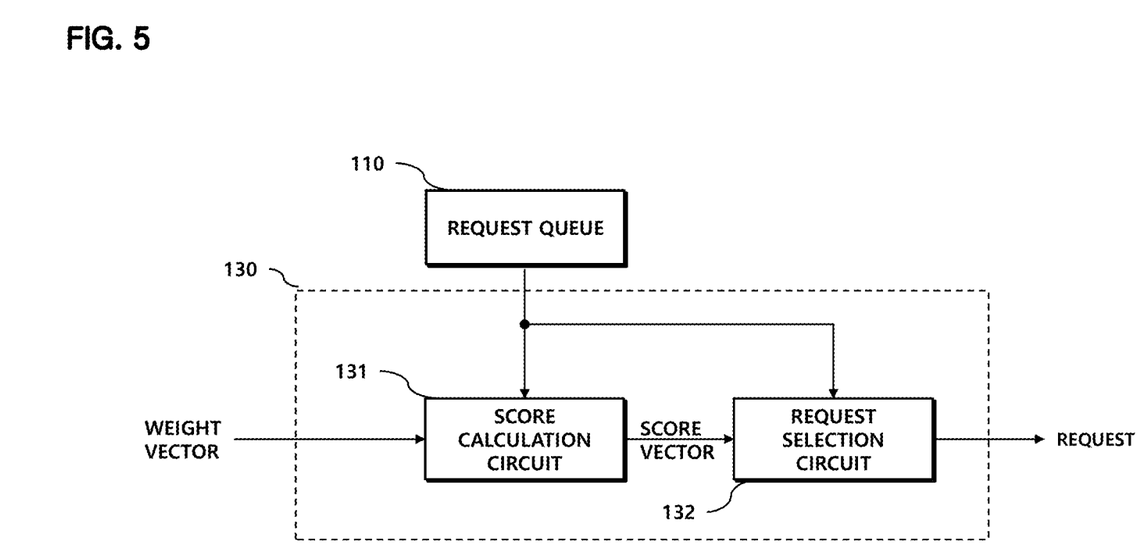
FIG. 5 is a block diagram of a scheduler of FIG. 1 according to an embodiment of the present disclosure.

FIG. 5 is a block diagram illustrating the scheduler 130 of FIG. 1 according to an embodiment.

In the present embodiment, the scheduler 130 may include a score calculation circuit 131 and a request selection circuit 132.

The score calculation circuit 131 generates a score vector by using variable values, which are calculated based on information provided by the request queue 110, and the weight vector provided by the weight generation circuit 120.

The score vector includes, as elements, scores corresponding to the requests stored in the request queue 110. The request selection circuit 132 selects a request corresponding to a maximum score among the scores included in the score vector, and outputs the selected request.

The score calculation circuit 131 calculates the variable values in order to calculate the scores corresponding to the requests, and calculates the scores by combining the variable values and the elements of the weight vector.

Figure 6:
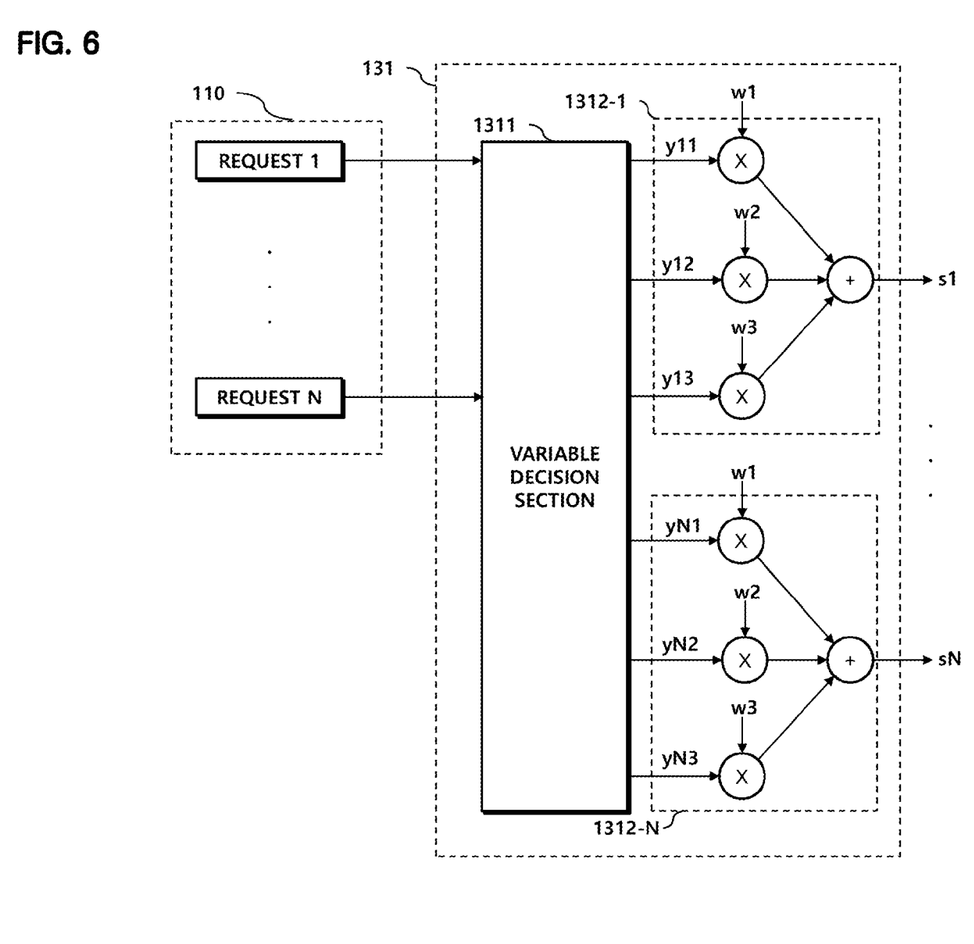
FIG. 6 is a detailed block diagram of a score calculation circuit of FIG. 5 according to an embodiment of the present disclosure.

FIG. 6 is a block diagram illustrating the score calculation circuit 131 of FIG. 5 according to an embodiment.

The score calculation circuit 131 includes a variable decision section 1311 and operating sections 1312-1 to 1312-N. The variable decision section 1311 determines variable values by using information provided by the request queue 110 in response to each request. The operating sections 1312-1 to 1312-N calculate scores, e.g., s1 to sN, by using the variable values, e.g., y11, y12, y13, ..., yN1, yN2, and yN3, outputted from the variable decision section 1311, and elements, e.g., first to third weights w1 to w3, of the weight vector provided by the weight generation circuit 120. Accordingly, the scores may be changed according to values of the first to third weights w1 to w3. In this embodiment, the number N corresponds to the number of requests stored in the request queue 110.

In the present embodiment shown in FIG. 6, the variable values yi1, yi2, and yi3 (i being in a range of 1 to N) are multiplied with the first, second, and third weights w1, w2, and w3, respectively, and then the multiplied values are summated. The summated value is output as a score si.

In the present embodiment, since three elements affecting scheduling performance are considered in scheduling a processing order of the requests, three variable values are determined for each request. As the number of elements affecting the scheduling performance to be considered in the request scheduling increases or decreases, the number of variable values and the number of weights may increase or decrease accordingly.

Figure 7:
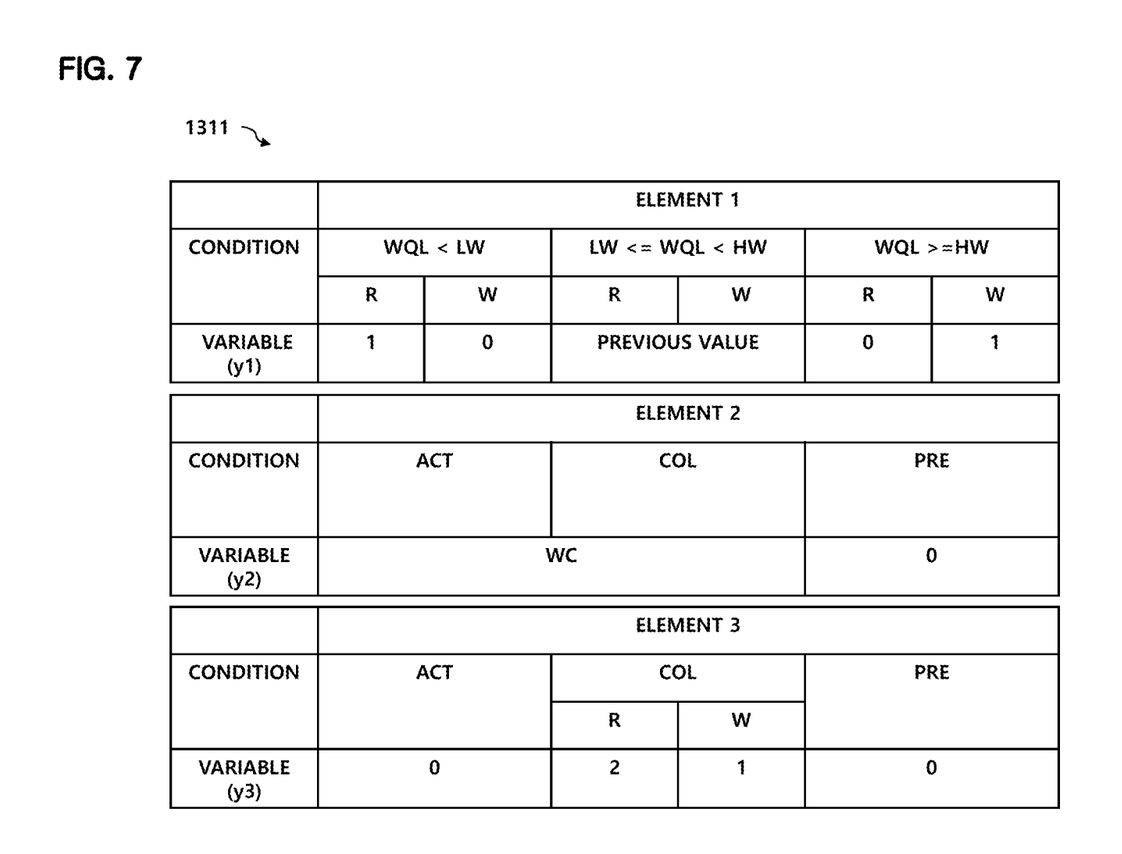
FIG. 7 is a table for explaining an operation scheme of a variable decision section of FIG. 6 according to an embodiment of the present disclosure.

FIG. 7 is a table for explaining an operation of the variable decision section 1311 of FIG. 6 according to an embodiment.

In the present embodiment, a value of a variable y1 is one of 0, 1, and a previous value of the variable y1. In an embodiment, when the length WQL of a write queue is smaller than a lower limit LW and a corresponding request is a read request, the value of the variable y1 is set to 1, and when the length WQL of the write queue is smaller than the lower limit LW and the corresponding request is a write request, the value of the variable y1 is set to 0.

Furthermore, when the length WQL of the write queue is equal to or greater than an upper limit HW and the corresponding request is a read request, the value of the variable y1 is set to 0, and when the length WQL of the write queue is equal to or greater than the upper limit HW and the corresponding request is a write request, the value of the variable y1 is set to 1.

Furthermore, when the length WQL of the write queue is equal to or greater than the lower limit LW and smaller than the upper limit HW, the value of the variable y1 is set to the previous value of the variable y1.

The aforementioned upper limit HW and lower limit LW are constant values arbitrarily selectable by those skilled in the art.

In the present embodiment, the value of the variable y2 is one of 0 and a standby cycle number WC, the standby cycle number WC corresponding to a period for which a corresponding request has waited.

In the present embodiment, when a command for processing a corresponding request is an active command ACT or a column command COL, the value of the variable y2 is set to the standby cycle number WC, and when the command is a precharge command PRE, the value of the variable y2 is set to 0.

In the present embodiment, the value of the variable y3 is 0, 1, or 2.

When a command for processing a corresponding request is the active command ACT or the precharge command PRE, the value of the variable y3 is set to 0. When the command is the column command COL, the value of the variable y3 is set to 2 when the corresponding request is a read request, and is set to 1 when the corresponding request is a write request.

The variable decision section 1311 of FIG. 6 performs the aforementioned operations to decide variable values corresponding to respective requests, and provides the variable values to the operating sections 1312-1 to 1312-N.

As described above, since scores for respective requests are obtained by multiplying the variable values with the corresponding weights, the scores of the respective requests are changed by adjusting the weights. As a result, it is possible to substantially and variably apply a scheduling rule.

In an embodiment, when the variable values are determined as illustrated in FIG. 7, if the third weight w3 is set to 0, the scheduler 130 performs a scheduling operation according to the FCFS rule. If the second weight w2 is set to 0, the scheduler 130 performs the scheduling operation according to the FR-FCFS rule.

As described above, the embodiments of the present disclosure provide a technical solution that optimizes the performance of a system by freely changing a scheduling rule using a weight vector.

While certain embodiments have been described above, it will be understood to those skilled in the art that the embodiments described are only examples. Accordingly, the memory controller described herein should not be limited based on the described embodiments. Rather, the memory controller described herein should only be limited in light of the claims that follow when read in conjunction with the above description and accompanying drawings.

What is claimed is:

1. A memory controller, comprising:
   a request queue that stores requests provided by an external device;
   a scheduler that calculates a score for each of the requests stored in the request queue and determines a processing order of the requests based on the scores for the requests; and
   a weight generation circuit that generates a weight vector including weights used to calculate the scores,
   wherein the scheduler calculates the score by combining a plurality of variables and the weight vector, the plurality of variables varying with a request, the weight vector being common to the requests,
   wherein the scheduler determines values of the plurality of variables according to a state of the request queue or a state of each of the requests, and
   wherein the weight generation circuit adjusts the weight vector based on an operation state of the memory controller or a weight control signal when information of the request queue is updated.

2. The memory controller according to claim 1, wherein the weight generation circuit comprises:
   a state observation section that generates a state vector including factors derived from the operation state of the memory controller; and
   a weight decision section that generates the weight vector based on the state vector or the weight control signal.

3. The memory controller according to claim 2, wherein the weight control signal is provided by an external device.

4. The memory controller according to claim 2, wherein the factors are selected from a group including a length of a read queue, a length of a write queue, a type of a request selected in the scheduler, a maximum processing time of a predetermined number of requests recently processed, and a hit rate in a prefetch operation performed by the memory controller.

5. The memory controller according to claim 2, wherein the weight decision section comprises:
   a control part that generates a plurality of selection signals based on the state vector, the weight control signal, and a current value of the weight vector; and
   a selection part that determines a next value of the weight vector from one or more constant values and the current value of the weight vector according to the plurality of selection signals.

6. The memory controller according to claim 5, wherein the one or more constant values include 1, −1, and 0.

7. The memory controller according to claim 5, wherein the control part generates the plurality of selection signals such that at least one of the one or more constant values is selected according to the weight control signal.

8. The memory controller according to claim 5, further comprising:
   a register circuit that stores the current value of the weight vector.

9. The memory controller according to claim 1, wherein the scheduler comprises:
   a score calculation circuit that generates a score by combining, with respect to each of the requests stored in the request queue, the plurality of variables and the weight vector; and
   a request selection circuit that selects one of the requests stored in the request queue according to the scores for the requests.

10. The memory controller according to claim 9, wherein the score calculation circuit comprises:
    a variable decision section that determines the plurality of variables corresponding to the requests based on the state of the request queue and the state of each of the requests; and
    operating sections that output the scores by combining the plurality of variables outputted from the variable decision section and the weight vector.

11. The memory controller according to claim 10, wherein the operating section outputs the scores by computing an inner product of a vector including the plurality of variables as elements and the weight vector.

12. The memory controller according to claim 10, wherein the state of the request queue includes at least one of a length of a read queue and a length of a write queue.

13. The memory controller according to claim 10, wherein the state of each of the requests includes at least one of a standby cycle number of each request, a type of each request, and a type of a command to be provided to a memory device in order to perform an operation corresponding to each request.

* * * * *